United States Patent
Turbe et al.

(10) Patent No.: US 9,412,985 B2
(45) Date of Patent: Aug. 9, 2016

(54) SAFETY DEVICE FOR A LITHIUM ELECTROCHEMICAL GENERATOR BATTERY

(71) Applicant: SAFT, Bagnolet (FR)

(72) Inventors: Benoit Turbe, Bordeaux (FR); Jerome Calmejane, Saint Germain du Puch (FR); Benoit Vasselin, Carbon Blanc (FR); Philippe Genin, Bordeaux (FR)

(73) Assignee: SAFT, Bagnolet (FR)

( * ) Notice: Subject to any disclaimer, the term of this patent is extended or adjusted under 35 U.S.C. 154(b) by 182 days.

(21) Appl. No.: 13/839,421

(22) Filed: Mar. 15, 2013

(65) Prior Publication Data

US 2014/0272479 A1    Sep. 18, 2014

(51) Int. Cl.
| | |
|---|---|
| *H01M 2/02* | (2006.01) |
| *H01M 2/10* | (2006.01) |
| *H01M 2/12* | (2006.01) |
| *B64C 1/00* | (2006.01) |
| *H01M 10/052* | (2010.01) |
| *B64C 1/06* | (2006.01) |

(52) U.S. Cl.
CPC .......... *H01M 2/1241* (2013.01); *H01M 2/1072* (2013.01); *H01M 2/1094* (2013.01); *H01M 10/052* (2013.01); *B64C 1/00* (2013.01); *B64C 1/06* (2013.01); *Y02E 60/122* (2013.01)

(58) Field of Classification Search
CPC ... H01M 2/12; H01M 2/1241; H01M 2/1072; H01M 2/1094
See application file for complete search history.

(56) References Cited

U.S. PATENT DOCUMENTS

| | | | | |
|---|---|---|---|---|
| 4,229,687 | A * | 10/1980 | Newman | 320/112 |
| 2005/0084748 | A1 * | 4/2005 | Miller et al. | 429/99 |
| 2010/0273034 | A1 * | 10/2010 | Hermann et al. | 429/62 |
| 2012/0045672 | A1 * | 2/2012 | Kruger | H01M 2/12 |
| | | | | 429/82 |

FOREIGN PATENT DOCUMENTS

| | | |
|---|---|---|
| DE | 10 2007 063 174 A1 | 6/2009 |
| EP | 2 109 165 A1 | 10/2009 |
| EP | 2 244 318 A2 | 10/2010 |
| EP | 2 403 050 A1 | 1/2012 |
| GB | 2 334 812 A | 9/1999 |

* cited by examiner

*Primary Examiner* — Kenneth Douyette
(74) *Attorney, Agent, or Firm* — Sughrue Mion, PLLC (57) ABSTRACT

A safety device (1) for a lithium electrochemical generator battery, including a box (100), configured to house a plurality of lithium electrochemical generators; a cover (200) arranged gas-tightly on the opening (130) of the box; an opening (120) forming a vent situated in one of the walls of the box (100) or situated in the cover (200); a conduit (300) having two openings (311, 312) where one of the openings (311) is gas-tightly connected to the opening (120) forming a vent of the box; a covering part (400) positioned gas-tightly at an opening of a wall of the compartment and the second opening (312) of the conduit, and where said covering part comprises a portion (410) adapted to tear at a threshold pressure Ps; where the walls of the box, the cover, the conduit and the covering part are secured to each other so as to ensure sealing against the gases up to a pressure above the threshold pressure Ps.

15 Claims, 4 Drawing Sheets

Figure 4

SAFETY DEVICE FOR A LITHIUM ELECTROCHEMICAL GENERATOR BATTERY

TECHNICAL FIELD

The technical field of the invention is that of lithium electrochemical generator batteries. The invention more particularly relates to a safety device for a lithium electrochemical generator battery.

BACKGROUND OF THE INVENTION

An electrochemical generator is an electricity producing device in which chemical energy is converted into electrical energy. The chemical energy is made up of electrochemically active compounds deposited on at least one face of electrodes positioned in the electrochemical generator. The electrical energy is produced by electrochemical reactions during the discharge of the electrochemical generator. The electrodes, which are positioned in a container, are electrically connected to current output terminals, which ensure electrical continuity between the electrodes and an electricity consumer with which the electrochemical generator is associated. The positive and negative current output terminals may be fastened either on the walls of opposite faces of the container of the electrochemical generator or on the wall of a same face of the container.

Several electrochemical generators can be connected together in series or in parallel as a function of the rated operating voltage of the electricity consumer and the quantity of energy that is planned to be provided to that consumer. The electrochemical generators are then placed in a shared housing, generally made up of a box and a cover, and the assembly of the housing and the plurality of electrochemical generators it contains are generally referred to as a battery. For convenience of electrical connection between electrochemical generators placed in a battery, the positive and negative output current terminals are often fixed on the wall of a same face of the container.

An anomaly in the operation of the battery may be caused by the malfunction of one of the electrochemical generators (short circuit, overload, etc.) or by an outside disturbance (impact, temperature increase, etc.) or by a failure of the electronic system managing the charge state or other parameters of the generators of the battery.

For example, when a lithium electrochemical generator is subjected to an overload, its temperature increases. The temperature increase causes an increase in the charge current, which further favors the temperature increase. If the generator does not have a sufficient cooling system to discharge the emitted heat, it is in a thermal runaway state: the temperature increase is fed by the generator itself. The uncontrolled increase in the temperature of the generator causes the generation of gases and their expansion inside the container of the generator. This expansion can cause an increase in the inner pressure inside the generator, which will open the gas discharge safety system. In the event hot gases are released, the temperature of which may reach 650° C., these gases come into contact with other generators of the battery. There is then a risk of the thermal runaway phenomenon spreading to all of the generators of the battery, which leads to the total destruction of the battery. This risk is particularly high in the case of generators of the lithium-ion type.

Technical solutions are known for cooling of the gases using the battery system alone. However, these do not currently enable sufficient cooling of the gases for the gases to be cooled enough at the output of the gas discharge safety system, which generally comprises a vent hole. These flames are then dangerous for the equipment integrating the battery as well as its users.

The aim of the invention is to propose a safety device making it possible first to contain any gases emitted by the lithium electrochemical generators, then to discharge them outside a compartment so as to avoid any contamination of that compartment as well as risks of self-ignition of the emitted gases.

BRIEF DESCRIPTION OF THE INVENTION

The invention relates to a safety device for a lithium electrochemical generator battery, comprising:
  a box designed to be placed in a compartment and configured to house a plurality of lithium electrochemical generators, said box comprising a plurality of assembled walls, an opening making it possible to introduce the electrochemical generators;
  a cover designed to be arranged gas-tightly on the opening of the box, allowing the introduction of the electrochemical generators;
  an opening forming a vent situated in one of the walls of the box or situated in the cover,
  a conduit comprising two openings where one of the openings is designed to be gas-tightly connected to the opening forming a vent of the box;
  a covering part designed to be positioned gas-tightly at an opening of a wall of the compartment and the second opening of the conduit, and where said covering part comprises a portion adapted to tear at the threshold pressure Ps;
where the walls of the box, the cover, the conduit and the covering part are secured to each other so as to ensure sealing against the gases up to a pressure above the threshold pressure Ps, and where the materials of the box, the cover, the conduit and the sealing part, capable of being in contact with the gases emitted by the lithium electrochemical generators, are materials dimensioned to withstand the gases emitted by said lithium electrochemical generators and withstanding at least a temperature of 150° C.

Such a safety device for a battery according to the invention makes it possible to guarantee the gas discharge so that there is no self-ignition and enables controlled discharge of the gases as well as resistance to the pressure variations of the enclosure of the battery, i.e., the box and the cover surrounding the battery.

In fact, owing to the invention, the gas discharge is channeled and thereby makes it possible to avoid a release of the gases into the environment of the battery, for example in an airplane cabin or any other passenger compartment. Such an arrangement of the safety device therefore makes it possible to hermetically seal the battery while withstanding the overpressure generated by the gas release.

In the context of the present invention, "lithium electrochemical generator" refers to a generator comprising at least one electrode, said electrode comprising electrochemically active material either made up of a material that can insert and/or remove lithium, or made up of metal lithium; according to one embodiment, the lithium electrochemical generator is chosen from among the list consisting of a Li Ion accumulator, a polymer Li accumulator, a lithium battery. In the case of a lithium battery, the electrochemical couple is for example chosen from among the list consisting of:

Li/SO2Cl2, Li/SOCl2, Li/SO2, Li/MnO2, Li/CFx-MnO2, Li/FeS2, Li/V205, Li/I2, Li/SVO (SVO standing for "Silver oxide+vanadium pentoxide").

In the context of the present invention, "compartment" refers to an enclosed space where a plurality of lithium electrochemical generators may be positioned; the compartment may be part of a vehicle or a building; in general, a compartment is designed to receive people frequently, in particular passengers; it may also be a location where people may pass occasionally, for example to perform monitoring operations in the space where the lithium electrochemical generators are positioned.

In the context of the present invention, "material capable of being in contact with the gases emitted by the lithium electrochemical generators, dimensioned to withstand the gases emitted by said lithium electrochemical generators" refers to a material having a resistance to the gases emitted by the lithium electrochemical generators for a sufficient time to allow the desired circulation of the gases and withstand the environment until the covering part tears at the threshold pressure Ps; the choice and sizing of such material for the various components of a safety device according to the present invention are within the general knowledge of one skilled in the art, who knows how to choose the type of material, its thickness, and any other relevant parameter as a function of the specifications of the battery.

In the context of the present invention, "gas-tight" refers to a sealed arrangement where the gases emitted by the lithium electrochemical generators are confined up to a pressure above the threshold pressure Ps, and which for example withstands an inner pressure of said gases greater than or equal to 1.5 times the threshold pressure Ps, for example a pressure comprised between 2 and 5 times the threshold pressure Ps.

According to different embodiments that may be combined according to all technically feasible solutions:

- the threshold pressure Ps is comprised between 0.5 bar and 5 bar, for example greater than or equal to 1 bar and/or less than or equal to 2 bar;
- the wall of the compartment is part of an aircraft cockpit and the threshold pressure Ps is comprised between 1 bar and 5 bar, for example greater than or equal to 1.5 bar and/or less than or equal to 3 bar; this arrangement of the safety device makes it possible to surround the battery such that it withstands any vacuums related to altitude increases that may occur when the battery is housed in an airplane;
- the conduit is a rigid hose or a rigidified flexible hose; according to one embodiment, the hose has a diameter comprised between 10 mm and 100 mm and a length comprised between 0.50 m and 3 m;
- the box is formed by a plurality of plates made from a material chosen from among the list consisting of aluminum and alloys thereof, steels, titanium and alloys thereof, and said plates are bent and/or welded to each other; according to one embodiment, there are five plates bent and/or welded to each other, assembled in a cuboid form, with a bottom plate opposite the opening of the box, two side plates with a first thickness e1 positioned across from each other and two other side plates with a second thickness e2 positioned across from each other, where the vent-forming opening is formed in one of the plates with thickness e2 and where the thickness e1 is comprised between 1 and 2 mm and the thickness e2 is comprised between 1.5 times and 3 times the thickness e1;
- the covering part is continuously connected and comprises thin areas forming at least one portion adapted to tear at the threshold pressure Ps; according to another embodiment, a thin area forms a closed curve around a part capable of at least partially detaching from the covering part when said thin area tears at the threshold pressure Ps; according to one embodiment, the thin area forming a closed curve is a slot, for example V-shaped or U-shaped;
- the covering part is made of a plurality of materials connected to each other by bonds and at least one bond can tear at a threshold pressure Ps;
- the safety device also comprises a device for cooling the conduit.

The present invention also relates to a vehicle comprising a passenger compartment separated from the outside by a wall, in which an opening is formed opening to the outside, and a safety device as described above, positioned in the compartment, whereof the covering part is gas-tightly fixed to said opening. According to one embodiment, the vehicle is chosen from the list consisting of an aircraft, rail transportation means, road transportation means, maritime or river transportation means. These are referred to as mobile applications. In this type of device, the outside generally consists of the open air that surrounds the vehicle. It is nevertheless possible to consider that the outside maybe made up of a confined space formed to receive gases emitted by the lithium electrochemical generators.

The present invention also relates to a building comprising a compartment separated from the outside by a wall, in which an opening is formed opening to the outside, and a safety device as described above, positioned in the compartment, whereof the covering part is gas-tightly fixed to said opening. The compartment is then defined as the part where the lithium electrochemical generator battery is housed. These are referred to as static applications. The outside may consist of a second room (or confined space) formed to receive gases emitted by the lithium electrochemical generators or the open air that surrounds the room where the battery is housed.

The present invention also relates to a method implementing a safety device as described above, where, in the event gases are released by the electrochemical generators positioned in the box, the gas is cooled in the conduit and produces tearing of the portion designed to tear at a threshold pressure Ps of the covering part when the gas reaches the threshold pressure Ps.

BRIEF DESCRIPTION OF FIGURES

In the various figures, similar elements are designated using identical references. Furthermore, the various elements are not necessarily shown to scale, so as to facilitate understanding of the invention.

DETAILED DESCRIPTION OF THE INVENTION

Figure 1:
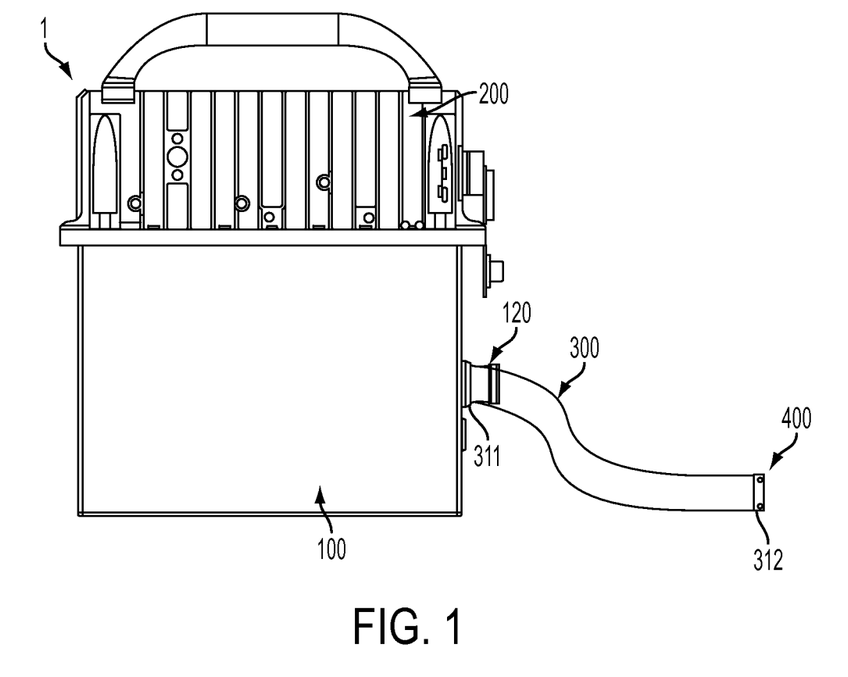
FIG. 1 is a diagrammatic illustration of the safety device according to the invention for a lithium electrochemical generator battery.
Figure 2:
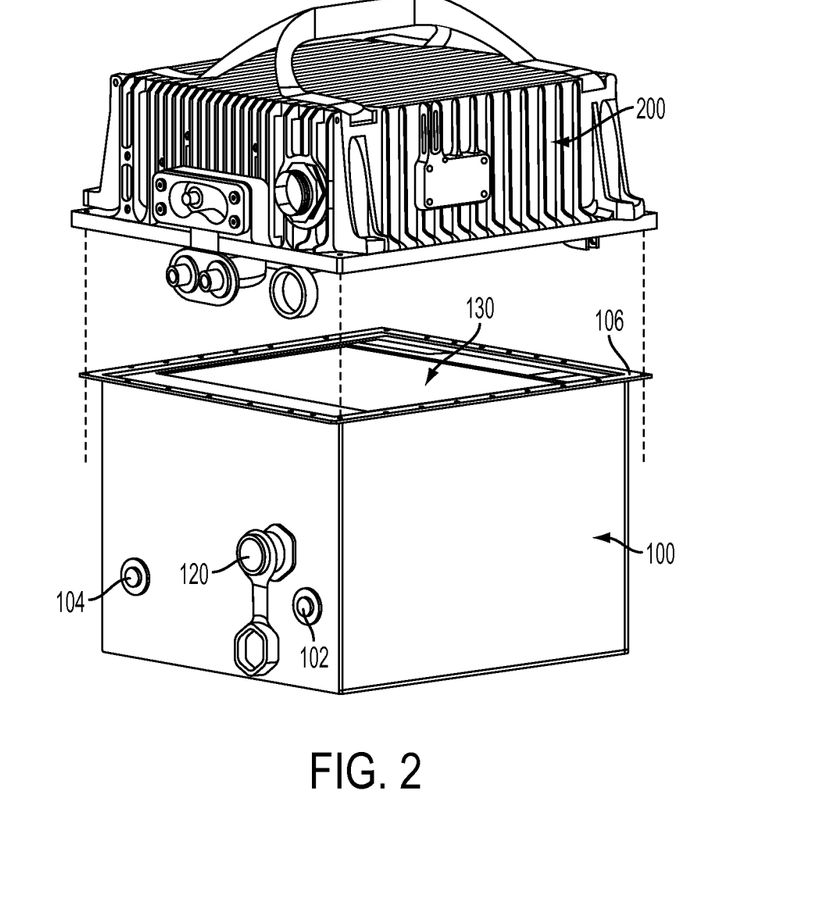
FIG. 2 is a diagrammatic illustration of the box and the cover for an electrochemical generator battery shown in FIG. 1.

In light of FIGS. 1 and 2, the invention relates to a safety device 1 for a lithium electrochemical generator battery comprising a box 100, a cover 200 and a conduit 300. These lithium electrochemical generators are intrinsically sealed during rated use. Nevertheless, they may release hot gases in the case of a malfunction or improper use.

The box 100 is designed to be placed in a compartment configured to house a plurality of lithium electrochemical generators. The electrodes of the electrochemical generators positioned in the box are electrically connected to current output terminals that ensure electrical continuity between the electrodes and electricity consumer with which the electrochemical generator is associated. In the present case, the current output terminals are situated in the cover 200.

The box 100 also comprises studs 102, 104 making it possible to ground the box; these may be fixed either on the walls of opposite faces of the box of the electrochemical generator, or on the wall of a same face of the box, as illustrated in FIG. 2.

Figure 3:
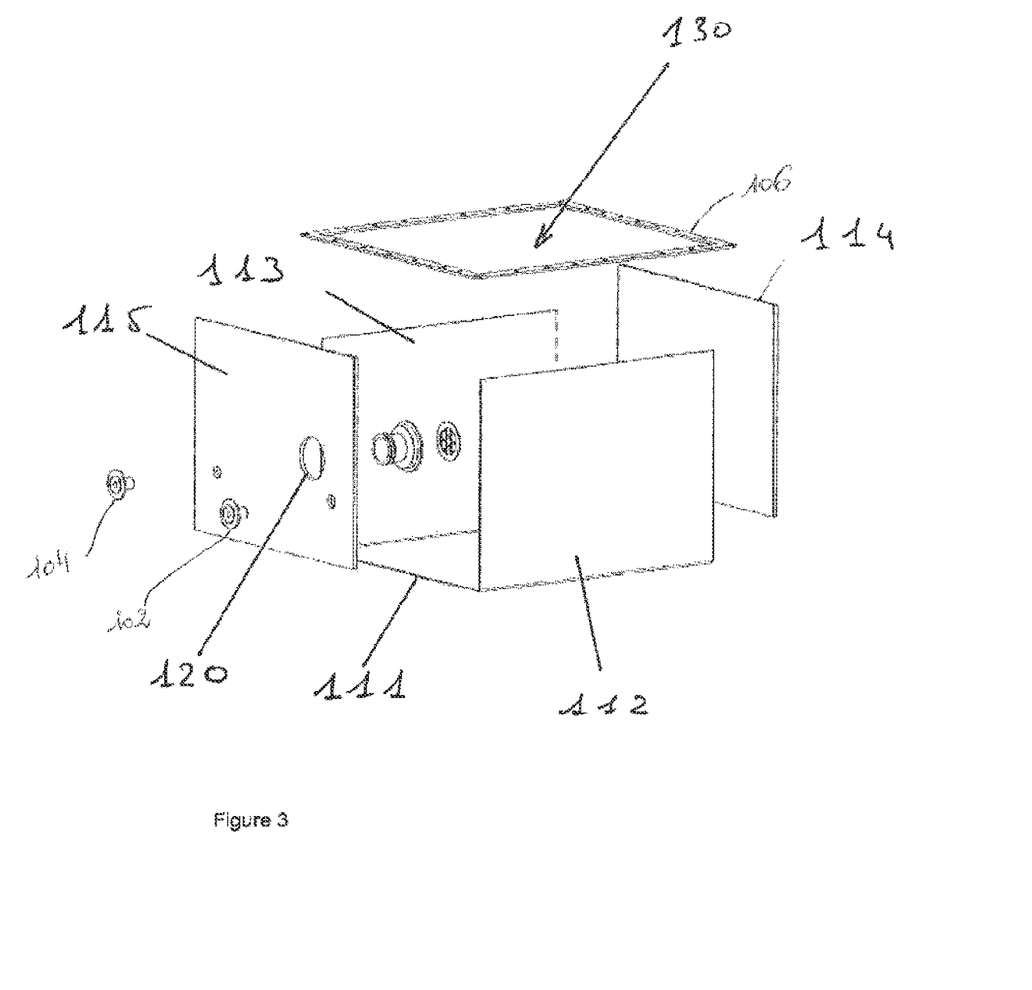
FIG. 3 is a diagrammatic illustration of the components of the box for an electrochemical generator battery shown in FIG. 1.

Furthermore, the box comprises a plurality of walls 111, 112, 113, 114, 115 assembled as illustrated in FIG. 3. The box also comprises a first vent-forming opening 120 in one of the walls, and a second opening 130 allowing the introduction of the electrochemical generators.

The cover 200 is designed to be arranged gas-tightly on the second opening 130 of the box, allowing the introduction of electric generators.

To that end, a connecting means 106 is arranged around the second opening 130 of the box between the cover 200 and the box 100 so as to ensure robust fastening between the box and the cover while guaranteeing sealing against the gases.

In light of FIG. 3, this connecting means 106 for example includes a reinforcing frame passed through by a plurality of fastening means ensuring secure fastening between the box 100 and the cover 200. Preferably, the fastening means are screws. Furthermore, the connecting means 106 includes a seal arranged so as to ensure sealing against the gases.

Such an arrangement makes it possible to guarantee excellent sealing as well as resistance to overpressure. Furthermore, the use of screws as the fastening means ensures reliable fastening while making it possible to disassemble the device.

Other connecting means can be considered so as to form the interface between the cover and the box while guaranteeing excellent sealing as well as resistance to overpressure. This interface may be made by welding, straps, a lock system, for example a switchable locking system known as toggle latches.

The conduit 300 comprises two openings 311, 312 where one of the openings 311 is designed to be gas-tightly connected to the first vent-forming opening 120 of the box.

This conduit makes it possible to discharge gases outside the equipment integrating the electrochemical generators.

The conduit is preferably made from a material withstanding a temperature of 200° C. continuously, which is metallic, composite or elastomer, and resistant to fluorinated gases. Of course, the more the material conducts heat, the better the cooling of the gases will be, that cooling being related to the heat exchange capacity of the channeling by natural convection.

Further, this cooling of the gas circulating in the conduit may be optimized for example by forced convection, i.e., by sending a pulsed cool air flow over the conduit, or by another cooling means of the exchanger type, for example by a liquid cooling circuit.

Advantageously, the conduit 300 is further a rigid hose or a rigidified flexible hose.

"Rigid hose" refers to a hose that cannot deform under standard usage conditions, for example which does not significantly deform if one tries to twist it by hand; one example of a rigid hose is a metal hose, for example a titanium hose whereof the wall thickness is comprised between 0.5 mm and 5 mm.

"Flexible hose" refers to a hose that can be bent easily, for example by hand. A rigidified flexible hose consists of a flexible hose rigidified by an outer structure that makes it difficult to deform under standard usage conditions; such a structure may for example be made up of a sheath, a grate, or metal wires surrounding the flexible hose.

Preferably, the diameter of the hose is comprised between 10 mm and 100 mm and the length thereof is comprised between 0.50 m and 3 m. The sizing results from a compromise between the volume of gas released by an element and the temperature of the gas, which depend on the type of electrochemical element, the average gas flow rate, the diameter of the channel of the vent, and the length of the conduit.

This arrangement of the conduit makes it possible to ensure sufficient cooling of the gases at the end of the conduit 312 opposite the opening 311 designed to be gas-tightly connected to the first vent-forming opening 120 of the box.

Thus, such a conduit makes it possible to obtain a discharge of the gases toward the outside of the equipment integrating the electrochemical generators without leakage with the environment in which the equipment is confined.

Figure 4:
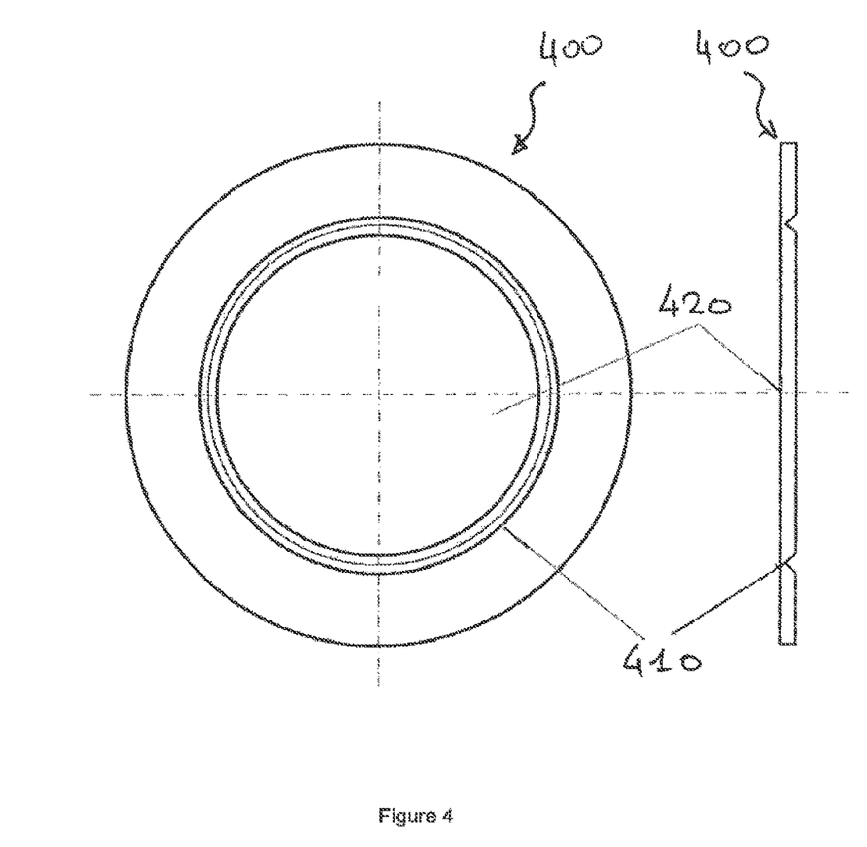
FIG. 4 is a diagrammatic illustration of the covering part of the safety device shown in FIG. 1.

The safety device 1 also includes a covering part 400 designed to be positioned gas-tightly during rated operation at the interface between an opening of a wall of the compartment and the second opening 312 of the conduit. The covering part 400 comprises a portion 410 adapted to tear at the threshold pressure denoted Ps. Of course, this threshold pressure Ps is below the pressure the conduit can withstand. The covering part will be further described below.

The walls of the box, the cover, the conduit and the covering part are secured to each other so as to ensure sealing against the gases up to a pressure above the threshold pressure Ps.

Preferably, the threshold pressure Ps is comprised between 0.5 bar and 5 bars, for example greater than or equal to 1 bar and/or less than or equal to 2 bars.

Preferably, the wall of the compartment is a portion of an aircraft cockpit and the threshold pressure Ps is comprised between 1 bar and 5 bars. For example, the threshold pressure Ps is greater than or equal to 1.5 bar and/or less than or equal to 3 bars.

Further, the materials of the box, the cover, the conduit and the sealing part, which may be in contact with gases emitted by the lithium electrochemical generators, are materials sized to withstand the gases emitted by said lithium electrochemical generators and able to withstand at least a temperature of 150° C.

Examples of materials that may be in contact with gases emitted by the lithium electrochemical generators include aluminum and alloys thereof, copper and alloys thereof, brass, nickel-plated steels, stainless steels, titanium and alloys thereof, nickel and alloys thereof, polyolefins, fluorinated polymers, saturated polyesters, phenolic resins, polyamides, aramids, epoxide resins, nitriles, silicones.

It is also possible to choose other materials that may be in contact with gases emitted by the lithium electrochemical generators by performing the following test:

a sample of the material to be tested is submerged in the non-aqueous electrolyte used for an electrical generator of the Li-Ion type (for example, an electrolyte consisting of a mixture of solvents comprising propylene carbonate (PC), dimethyl carbonate (DMC) and ethylene carbonate (EC) and a lithium salt LiPF6 with concentration 1.5 M.) for a period of 21 days at a temperature of 60° C.;

the mass loss of the sample is measured, and it is observed whether the integrity of the sample is preserved; observations may also be done during intermediate periods, for example after 7 days and/or 14 days;

a material is considered to be able to be in contact with gases emitted by the lithium electrochemical generators if its mass loss is less than or equal to 10%, preferably less than or equal to 5% mass loss after 21 days of submersion, and its integrity is preserved insofar as no cracking is observed throughout the sample.

According to one embodiment, the box is formed by a plurality of plates made from a material such as aluminum and alloys thereof, steels, titanium and alloys thereof. Furthermore, said plates are bent and/or welded to each other.

Preferably, there are five plates bent and/or welded to each other in a cuboid form, with a bottom plate 111 opposite the opening 130 of the box. Two side plates 112, 113 with a first thickness e1 are positioned across from each other. Two other side plates 114, 115 with a second thickness e2 are also positioned across from each other. The vent-forming opening is formed in one of the plates with thickness e2. The thickness e1 is comprised between 1 and 2 mm and the thickness e2 is comprised between 1.5 times and 3 times the thickness e1.

This arrangement of the box combining different thicknesses of the plates makes it possible to obtain good resistance to overpressure while having an optimized mass. Furthermore, in the case of an aircraft equipped with a safety device according to the invention, this arrangement of the box also makes it possible to obtain good resistance to the pressure/vacuum cycles related to landing, take off, and flights at altitude.

In a privileged manner, the covering part 400 is formed continuously. It comprises thin areas 410 forming at least one portion suitable for tearing at the threshold pressure Ps. These thin areas form fragile areas. The thickness and shape of the thin portion are calculated to cause tearing of the thin area when the pressure inside the safety device, and in particular in the conduit at the covering part, exceeds the predetermined threshold value Ps.

According to one embodiment, the covering part is made from metal, for example chosen from the list consisting of aluminum and alloys thereof, copper and alloys thereof, brass, nickel-plated steels, stainless steels, titanium and alloys thereof, nickel and alloys thereof.

For example and advantageously, the covering part 400 includes a thin area forming a curve closed around a portion 420 capable of at least partially detaching from the covering part when said thin area tears at the threshold pressure Ps. In the illustrated and non-limiting example, the curve is a circle.

For example, the thin area forming a closed curve is a slot, for example V-shaped or U-shaped.

According to another example, the covering part is made up of a plurality of materials connected to each other by bonds and at least one bond is adapted to tear at the threshold pressure Ps. Such a covering part may for example be made up of a ring made from a first material, for example a metal ring, on or in which a plate or film of a second material is fastened, for example an organic material.

During operation, when gas is released by an electrochemical generator positioned in the box of a safety device according to the invention, the gas "escapes" through the opening 120 of the box and circulates in the conduit toward the second opening 312 of the conduit where the covering part is situated. The gas is cooled in the conduit and accumulates therein, thereby increasing the pressure inside the safety device, and in particular at the covering part 400. The overpressure of the gases inside the safety device 1 creates, on the covering part, a thrust force oriented toward the outside of the safety device 2.

When the gas reaches the threshold pressure Ps, the thrust force causes the fragile part of the covering part to break by tearing the portion of the covering part adapted to break at that threshold pressure Ps. The gas can then escape through the opening of the wall of the compartment, i.e., toward the outside of the equipment integrating the electrochemical generators without leakage with the environment in which the equipment is confined.

The invention also relates to a vehicle comprising a compartment separated from the outside by a wall, in which an opening is formed opening to the outside. For example, the vehicle is an aircraft, rail transportation means, road transportation means, or maritime or river transportation means.

According to the invention, the vehicle also includes a safety device as previously described positioned in the compartment and whereof the covering part is gas-tightly fastened with respect to said gases at said opening.

The invention also relates to any building including the vehicle as described above.

The invention thus guarantees the non-intrusion of water or other foreign bodies in the battery system and guarantees the integrity thereof throughout its entire life. The safety device according to the invention thus makes it possible to guarantee the performance of the battery and complete safety for the user by controlling the unwanted event, and in the case where the battery is subject to pressure variations, in particular for aeronautical or submerged applications.

Furthermore, the particular arrangement of the safety device gives it a light weight and therefore a certain compactness, which are advantages for aeronautic and/or submerged applications.

EXAMPLE

The Applicant has performed tests on a safety device according to the invention whereof the conduit is a silicone hose, with a diameter of 30 mm, a length of 1.40 m, and whereof the wall has a thickness of 5 mm.

The selected covering part is a rupture disc marketed by the company HELYON, bearing commercial reference C90rb2, 6-05v DN 50 (vacuum-resistant, comprising a maintaining ring made from SS 316, a flat composite disc, a Monet (fragmenting) sealing membrane, whereof the outer diameter is 90 mm and the rupture diameter is 50 mm).

The junctions between the box and the covering part as well as between the conduit and the covering part are ensured by stainless steel collars tightened by screws. These junctions respect the requirements of standard ABS0395 used in the aeronautic field.

Tests showed that the maximum temperature measured in the dead space of the battery enclosure was approximately 490° C., while at the outlet of the conduit, it was 270° C., thereby showing that a correctly sized conduit enables significant cooling of the gases. In this way, it authorizes a safety margin so as to guarantee non-ignition of the gases at the outlet of the conduit, the ignition temperature of the fluorinated gases being approximately 350° C.

It was also shown that the battery enclosure is capable of containing an overpressure of the gases generated by thermal runaway and that the conduit makes it possible to extract the gases toward an identified and controlled outlet.

Furthermore, these tests have shown that the enclosure of the battery, i.e., the box, the cover and the conduit, are capable of bearing an overpressure greater than that of the rupture of the covering part. In these trials, the covering part comprised a portion adapted to tear at a threshold pressure of 4 bars. Only the covering part gave way under that pressure.

Of course, the present invention is not limited to the examples and embodiments described and shown, but on the contrary is open to many alternatives available to those skilled in the art.

The invention claimed is:

1. A safety device for a lithium electrochemical generator battery, comprising:
   a box configured to be placed in a compartment and configured to house a plurality of lithium electrochemical generators, said box comprising a plurality of assembled walls, an opening making it possible to introduce the electrochemical generators;
   a cover configured to be arranged gas-tightly on the opening of the box, allowing the introduction of the electrochemical generators;
   an opening forming a vent situated in one of the walls of the box or situated in the cover,
   a conduit comprising two openings where the first opening is gas-tightly connected to the opening forming a vent of the box and the second opening is gas-tightly connected to an opening of a wall of the compartment;
   a covering part fixed gas-tightly at the opening of the wall of the compartment and the second opening of the conduit, and where said covering part comprises a portion adapted to tear at a threshold pressure Ps;
   wherein the wall of the compartment is part of an aircraft cockpit and the threshold pressure Ps is comprised between 1 bar and 5 bar;
   wherein the walls of the box, the cover, the conduit and the covering part are secured to each other so as to ensure sealing against the gases up to a pressure above the threshold pressure Ps, and where the materials of the box, the cover, the conduit and the covering part, capable of being in contact with the gases emitted by the lithium electrochemical generators, are materials dimensioned to withstand the gases emitted by said lithium electrochemical generators and withstanding at least a temperature of 150° C.

2. The safety device according to claim 1, where the conduit is a rigid hose or a rigidified flexible hose.

3. The safety device according to claim 1, where the hose has a diameter comprised between 10 mm and 100 mm and a length comprised between 0.50 m and 3 m.

4. The safety device according to claim 1, where the box is formed by a plurality of plates made from a material chosen from among the list consisting of aluminum and alloys thereof, steels, titanium and alloys thereof, and said plates are bent and/or welded to each other.

5. The safety device according to the claim 1, where there are five plates bent and/or welded to each other, assembled in a cuboid form, with a bottom plate opposite the opening of the box, two side plates with a first thickness e1 positioned across from each other and two other side plates with a second thickness e2 positioned across from each other, where the vent-forming opening is formed in one of the plates with thickness e2 and where the thickness e1 is comprised between 1 and 2 mm and the thickness e2 is comprised between 1.5 times and 3 times the thickness e1.

6. The safety device according to claim 1, where the covering part is continuously connected and comprises thin areas forming at least one portion adapted to tear at the threshold pressure Ps.

7. The safety device according to claim 1, where a thin area forms a closed curve around a part capable of at least partially detaching from the covering part when said thin area tears at the threshold pressure Ps.

8. The safety device according to claim 7, where the thin area forming a closed curve is a slot, for example V-shaped or U-shaped.

9. The safety device according to claim 1, where the covering part is made of a plurality of materials connected to each other by bonds and at least one bond can tear at a threshold pressure Ps.

10. The safety device according to claim 1, also comprising a device for cooling the conduit.

11. A vehicle comprising a passenger compartment separated from the outside by
    a wall, in which an opening is formed opening to the outside, and a safety device according to claim 1, positioned in the compartment, whereof the covering part is gas-tightly fixed to said opening.

12. The vehicle according to claim 1, where the vehicle is chosen from the list consisting of an aircraft, rail transportation means, road transportation means, maritime or river transportation means.

13. A building comprising a compartment separated from the outside by a wall, in which an opening is formed opening to the outside, and a safety device according to claim 1, positioned in the compartment, whereof the covering part is gas-tightly fixed to said opening.

14. A method implementing a safety device according to claim 1, where, in the event gases are released by the electrochemical generators positioned in the box, the gas is cooled in the conduit and produces tearing of the portion configured to tear at a threshold pressure Ps of the covering part when the gas reaches the threshold pressure Ps.

15. An aircraft comprising a passenger compartment separated from the outside by a wall, in which an opening is formed opening to the outside, and a safety device for a lithium electrochemical generator battery, said safety device being positioned in the compartment and comprising:
    a box configured to be placed in the passenger compartment and configured to house a plurality of lithium electrochemical generators, said box comprising a plurality of assembled walls, an opening making it possible to introduce the electrochemical generators;
    a cover configured to be arranged gas-tightly on the opening of the box, allowing the introduction of the electrochemical generators;
    an opening forming a vent situated in one of the walls of the box or situated in the cover,
    a conduit comprising two openings where the first opening is gas-tightly connected to the opening forming a vent of the box and the second opening is gas-tightly connected to an opening of a wall of the compartment; and
    a covering part fixed gas-tightly at the opening of the wall of the compartment and the second opening of the conduit, and where said covering part comprises a portion adapted to tear at a threshold pressure Ps; where the wall of the compartment is part of an aircraft cockpit and the threshold pressure Ps is comprised between 1 bar and 5 bar,
    wherein the walls of the box, the cover, the conduit and the covering part are secured to each other so as to ensure sealing against the gases up to a pressure above the threshold pressure Ps, and where the materials of the box, the cover, the conduit and the covering part, capable of being in contact with the gases emitted by the lithium electrochemical generators, are materials dimensioned to withstand the gases emitted by said lithium electrochemical generators and withstanding at least a temperature of 150° C.

\* \* \* \* \*